T. H. WICKWIRE.

WOVEN WIRE FABRIC AND PROCESS OF MANUFACTURING SAME.

APPLICATION FILED OCT. 21, 1918.

Reissued Dec. 17, 1918. 14,573.

Inventor:

Theodore H. Wickwire,

By Dodger Sons,

Attorneys.

UNITED STATES PATENT OFFICE.

THEODORE H. WICKWIRE, OF CORTLAND, NEW YORK, ASSIGNOR TO WICKWIRE BROTHERS, INC., OF CORTLAND, NEW YORK, A CORPORATION OF NEW YORK.

WOVEN WIRE FABRIC AND PROCESS OF MANUFACTURING SAME.

14,573. Specification of Reissued Letters Patent. Reissued Dec. 17, 1918.

Original No. 1,094,507, dated April 28, 1914, Serial No. 675,756, filed February 6, 1912. Application for reissue filed October 21, 1918. Serial No. 259,125.

*To all whom it may concern:*

Be it known that I, THEODORE H. WICKWIRE, a citizen of the United States, residing at Cortland, in the county of Cortland and State of New York, have invented certain new and useful Improvements in Woven Wire Fabric and Processes of Manufacturing Same, of which the following is a specification.

This invention pertains to the manufacture of wire gauze or wire cloth having a protecting coating of non-corrodible metal, or of metal less readily corrodible than the original wires or strands constituting the foundation of the fabric.

The object of the invention is to produce at relatively small cost a wire fabric capable of withstanding the corroding effect of salt air or damp air, and in greater or less degree capable of withstanding the effect of fumes and vapors arising from chemical and metallurgical processes and the like.

The invention consists in first coating the wire with a protecting metal while in the strand and before weaving it into gauze, cloth or fabric, thereafter weaving it into such fabric, and finally, electro-plating the woven fabric.

In the accompanying drawings I have illustrated in somewhat conventional or diagrammatic fashion, apparatus by which my improved process may be carried out, but it is to be understood that this is merely suggestive, and that any suitable form of apparatus may be employed therefor, and that the process may be carried out manually without any special type of machinery or apparatus. In these drawings, in which actual scale dimensions are not attempted:

Figure 1:
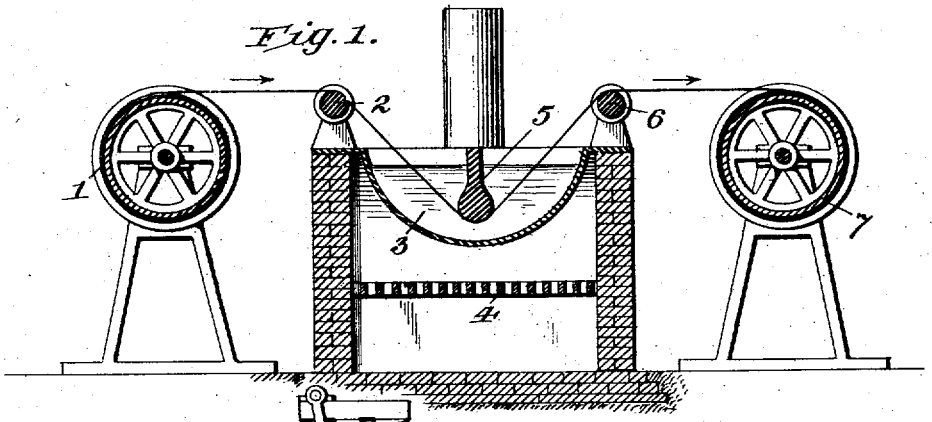
Figure 1 is a vertical sectional view of the apparatus for first coating the wire with a protecting metal while in the strand and before weaving.
Figure 2:
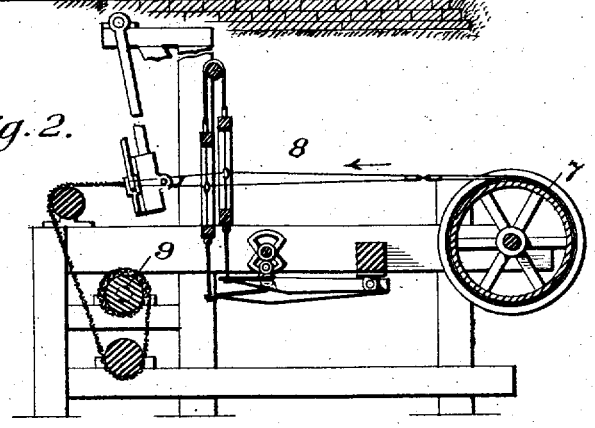
Fig. 2 is a similar sectional view of a loom for weaving the coated wires into a fabric.
Figure 3:
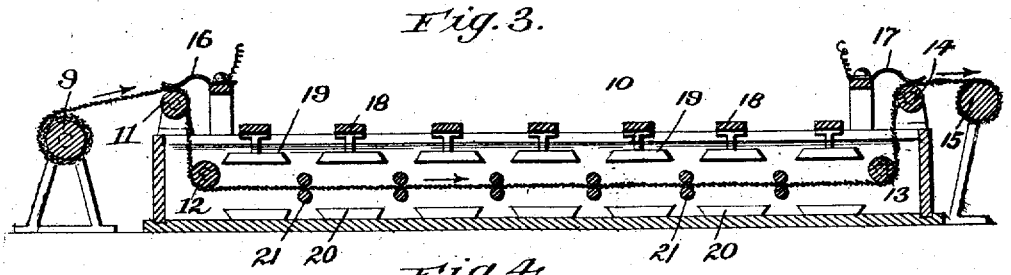
Figure 4:
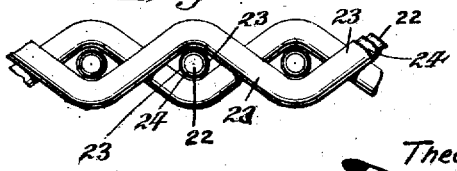

Fig. 3, a like sectional view of a plating bath suitable for electro-plating the woven fabric; and Fig. 4, a sectional view of the woven fabric.

In order that the scope of my invention may be more perfectly defined, and that the reasons for the particular mode of procedure may be better understood, prior plans may be briefly noticed.

At the present time large quantities of wire cloth or gauze suitable for window and door screens, for sieves, and the like, are woven of non-corrodible metal, or metal which corrodes but slightly. This product is highly satisfactory in many respects, but is quite costly, the cost being for many uses prohibitive. The question of strength of the wire is also a factor, iron or steel wire of given gage possessing greater tensile strength than copper or like wire of the same diameter.

To meet this difficulty it has been proposed, first, to coat the wire in the strand by the "hot process", that is to say, by dipping it into or passing it through a bath of suitable metal or metals in a molten state; next weaving the coated wire into a fabric,—wire gauze, screen, or cloth; and finally, subjecting the woven fabric to like treatment in a bath of molten metal.

This mode of treatment, while adequately protecting the wire, produces a relatively rough fabric, the wires of which are soldered together at every point of crossing, and the meshes of which are more or less irregular by reason of unequal thickness of the final coating at different points. For use as sieves and the like, wire having such irregular meshes is peculiarly unsatisfactory, and will not give the uniformity of sifted product necessary in many situations.

To overcome the difficulty just noted, it has been proposed to employ in connection with the final dipping process, air blasts directed against the fabric as it emerges from the bath, and serving to blow off any surplus metal which might occasion protuberances or roughnesses. This process, while perhaps improving the product in a degree, results in a fabric the individual wires of which are soldered together at their points of intersection or crossing, and this, for many uses, is objectionable, while it may be a benefit in connection with other uses.

It has also been proposed to weave the cloth, gauze, or fabric of uncoated wires, and after weaving to electroplate the fabric. This does not produce a fabric of the character or quality required for many uses, and for two reasons: First, metal electrically deposited is more or less porous in its nature, and unless the coating be quite heavy, is liable to contain minute pores and openings through which moisture, fumes, and the like, may reach and attack the foundation wire or strand. Second, in plating the fabric or electrically coating it in its woven form, it is impossible to effect a complete covering of the metal by the electrically applied layer or coating at all points, and particularly at the points of contact of the different wires, which points are of great number.

It is therefore essential to the production of a perfectly covered or protected fabric capable of withstanding conditions of use such as stated, that it be first well covered in the strand, and that it be subsequently again coated after being woven into fabric, so that the additional thickness or weight of coating desirable be afforded, and any points uncovered through the bending, scraping, or scratching of the preliminarily coated wire in the course of weaving, may be protected by the second coating.

My process therefore consists in the following steps: First, applying to the foundation wire while in the strand and before weaving, a protecting coating of metal by immersion in or passage through a metal bath of any suitable or usual character. Second, weaving such preliminarily coated wire into a cloth, gauze, screen, or like fabric; and third, applying to the woven fabric by electro-deposition a final protecting coating.

Referring now to the drawings, 1 indicates a drum or reel upon which wire is wound in single and independent strands. 2 a guide roller over which the strands are led to a bath, 3, of metal which is kept in molten condition by fire upon a grate 4, or through other means of heating, the wires passing beneath a depending guide 5 of material capable of withstanding the heat, and from which the wires pass to and over a second guide roller 6, and finally to a receiving drum or reel 7. In thus passing through the preliminary coating apparatus, which may be of any usual character, the wires, slightly separated one from another, become coated with the metal of the bath, usually lead, tin or the like. The wires thus receive and retain a thin film of the metal, which, cooling, adheres tenaciously thereto.

The reel 7 thus charged with coated wires, is then mounted in a wire-weaving loom 8, the shuttle of which is provided with wire similarly coated, and the coated wires are woven into a fabric of suitable mesh, either gauze or coarser fabrics, according to the intended use, the finished product being received and wound on a beam 9, as usual. From the loom 8 the beam 9 is carried to an electro-plating tank 10, where the fabric is led over a guide roller 11, thence downward beneath a similar guide roller 12, of wood or other suitable material immersed in the solution of the bath, thence lengthwise of the bath and through the solution, to a like roller 13 at or near the opposite end, thence upward and over a guide roller 14 above the tank, and finally to a beam 15 on which the electro-plated woven fabric is wound.

16 and 17 indicate contact fingers or plates connected with a battery or other source of electric current, and arranged to bear upon the woven wire fabric as it enters and leaves the vat or tank. 18 indicates a cross bar or support, of which a suitable number is provided, each reaching across the top of the tank from side to side, and serving to support an anode 19 above the fabric but within the solution, a second set of anodes 20 being placed on the floor of the vat beneath the fabric. To prevent the fabric from sagging or from bulging upward between the rollers 12 and 13, smaller rollers or round wooden guide rods 21 may be placed across the tank or vat at intervals, as shown.

The plating operation *per se* does not differ in any respect from that usually employed for the electro-deposition of metals, and obviously, the plating bath may be varied considerably without departing from the spirit or scope of my invention.

The product resulting from the process above described is illustrated on an enlarged scale in Fig. 4, where it will be seen that each wire 22 has two coatings 23 and 24, and that there is no soldering together of the wires, or adherence of one to another at points of contact. This is characteristic of the fabric as actually produced, and obviates the difficulties of prior processes. In other words, complete freedom of the wires and consequent flexibility of the fabric is secured, and at the same time all parts of every wire, including those points at which the wires contact one with another, are protected by a coating of non-corroding metal, and except for possibly very minute spaces they are protected with a double coating, giving at once adequate protection to the foundation wire and the desired finish, color, and protection to the fabric as a whole.

I have described the initial coating of the wire as effected by the "hot process", and this I deem eminently desirable, and materially preferable to electro-plating the wire in the strand, because a more dense, close or homogeneous coating is thereby insured, and one less liable to strip or peel when the wire is bent, stretched, rubbed, or scratched in the subsequent process of weaving it into cloth or fabric. So far as I am aware, however, no one has heretofore applied a metallic coating to the wire in the strand, then woven it into cloth, and finally electro-plated the cloth; hence I mean to claim broadly these steps, and also to claim specifically the process wherein the first step is performed only by the "hot process", the latter producing a more highly satisfactory product than I deem obtainable by merely applying both coatings by electro-deposition.

By my process I am thus enabled to produce at relatively low cost a strong wire fabric, which withstands atmospheric conditions in hot and moist climates where the air is salt, and capable also of withstanding in considerable measure fumes, vapors, and moisture charged in greater or less degree with chemical agents which would attack and corrode the unprotected foundation wire. The fabric likewise has the further desirable quality of being flexible in all directions, each wire being free from and not soldered or joined to other wires which it crosses, or with which it lies in contact. This is a very desirable feature, and one which I believe has never before been attained in wire cloth or fabric having both a preliminary and a final coating.

It is to be understood that the particular bath employed for the initial or preliminary coating is variable at will, and may be any of the well-known or usual baths employed for the like purpose, the composition of the bath varying according to the contemplated use of the product. The electro-deposition may similarly be by the galvanic process, or through the use of dynamo-electric machinery, that is to say, it may be according to any well-known and approved mode of electro-deposition.

Having thus described my invention, what I claim is:—

1. The method of producing protected woven wire fabric, which consists in the following steps; first, applying to the wire while in the strand and before weaving, a protecting metal coating; second, weaving the wire thus coated into a fabric; and third, electroplating the woven fabric.

2. The method or process of producing protected wire fabric, which consists in, first immersing the wire while in the strand in a molten metallic bath; second, weaving the wire after treatment in said bath into a fabric; and third, electroplating the woven fabric.

3. The herein-described fabric composed of wire having an intitial coating applied to it while in the strand and before weaving, and a second coating applied by electro-deposition after weaving.

4. As a new article of manufacture, a flexible woven wire fabric suitable for window screens, the same composed of wire having a primary coating of congealed metal, and an outer coating of electrically deposited metal, the latter coating being applied to the fabric after weaving, whereby cracks and abrasions incident to weaving are closed or covered.

5. As a new article of manufacture, a woven wire fabric composed of wire having a primary coating of congealed metal applied in the strand, and an outer coating of electrically deposited metal applied after weaving, the strands being free and disconnected at their points of crossing.

In testimony whereof I have signed my name to this specification.

THEODORE H. WICKWIRE.